United States Patent Office 2,871,155
Patented Jan. 27, 1959

2,871,155

FUNGICIDAL COMPOSITION COMPRISING CYCLOHEXIMIDE AND SOLUBILIZED LIGNIN

William Klomparens, Kalamazoo, and Clement D. Vellaire, Richland Township, Kalamazoo County, Mich., assignors to The Upjohn Company, Kalamazoo, Mich., a corporation of Michigan No Drawing. Application March 20, 1957
Serial No. 647,199

19 Claims. (Cl. 167—42)

This invention relates to a composition of matter and to a process. More particularly, it is directed to a process for reducing the phytotoxicity of cycloheximide, and/or protecting plants from the phytotoxicity of cycloheximide, and to cycloheximide-containing compositions having reduced phytotoxicity.

Cycloheximide is an antibiotic substance produced as an elaboration product of *Streptomyces griseus* according to the procedures set forth in U. S. Patents 2,574,519 and 2,612,502. It has been shown to have high activity against certain fungal organisms and is particularly useful for the control of plant fungal infections such as cherry leaf spot, wheat rust, bean anthacnose, rose powdery mildew, and like fungal infections of plants. Its use for the control of fungal infections in some plants, especially roses, has been restricted however, because of the relatively high phytotoxicity of cycloheximide. For example, see Vaughn et al., Mich. Ag. Expt. Sta. Quar. Bull., vol. 31, No. 4, pages 456–464, May 1949.

It is an object of this invention to provide a process for reducing the phytotoxicity of cycloheximide. It is a further object of the invention to provide cycloheximide-containing compositions having reduced phytotoxicity.

These objects are accomplished in the present invention by concomitantly applying to the plant foliage cycloheximide and solubilized lignin. By incorporating solubilized lignin, such as sulfite lignins and alkali lignins, into the compositions used for applying cycloheximide to the foliage of plants that have established or that are subject to fungal infection, or otherwise concomitantly applying solubilized lignin and cycloheximide thereto, the concentration of cycloheximide applied to the foliage can be materially increased without adverse effect on the plants.

Solubilized lignins are obtained primarily as by-products of the paper industry. They are classified generally as sulfite lignins and alkali lignins. The alkali lignins are sometimes sub-classified into sulfate lignins and soda lignins.

The sulfite lignins are ordinarily obtained from the sulfite waste liquor of acid sulfite pulp mills. In the sulfite process, the lignins, combined in the wood as protolignins, are converted into lignosulfonates. They are useful according to the invention in their free acid form or as the alkali metal, including ammonium, and the alkaline earth metal, including magnesium, salts. The calcium, magnesium, sodium, and ammonium salts are commonly recovered. The sulfite lignins are commonly marketed under such names as Binderine, Glutarin, Goulac, Maracell, Marasperse, Maratan, and Maratex. A particularly effective sulfite lignin according to the invention is a calcium lignosulfonate marketed under the trade name Toranil B.

The alkali lignins (lignates) are obtained from the so-called black liquor of the alkali digestion of wood to form pulp. In the sulfate process which is commonly used for coniferous woods, the wood chips are digested in an approximately ten percent solution of a mixture of sodium hydroxide with about twenty mole percent sodium sulfide. In the soda process which is mainly applied to deciduous woods, the wood chips are digested in about ten percent sodium hydroxide with or without a little sodium sulfide. Solubilization can be effected with any of the alkali metals including ammonium. The solubilized lignin produced in both the sulfate and the soda processes is known in the art as alkali lignins. The alkali lignins are sometimes sub-classified as sulfate lignins and soda lignins according to the process used. Alkali lignins sold under the trade name Indulin are examples of sulfate lignins and those sold under the trade names Meadol and Tomlinite are examples of soda lignins. Both types are useful according to the invention.

Lignins obtained in the alkali digestion process can be converted to lignosulfonates by known procedures, and the lignosulfonates so produced can be used herein in place of those recovered in the sulfite process.

The effect of solubilized lignins in reducing the phytotoxicity of cycloheximide is shown in Table I. Unless otherwise noted, bean plants of the Black Valentine or Michelite varieties were sprayed at the time the trifoliate leaves were beginning to appear with aqueous solutions consisting of cycloheximide and the additive.

TABLE I

*Effect of solubilized lignins in correcting phytotoxicity caused by spraying Black Valentine or Michelite bean with aqueous solutions containing 25.0 p. p. m. of cycloheximide*

| Material | Tank Mixture Rate, percent | Protective Activity |
|---|---|---|
| Calcium lignosulfonate (Toranil B) | 0.5 | Very good. |
| Sodium lignate (Indulin C) | 0.5 | Slight to good. |
|  | 1.0 | Very good. |
| Sodium lignate (Indulin B) | 0.5 | Fair to good. |
| Sodium lignosulfonate (Marasperse N) | 0.5 | Good. |
| Sodium lignosulfonate (Polyfon O) | 0.1 | Fair to good. |
| Controls: |  |  |
| No additive |  | No effect. |
| Modified phthalic glycerol alkyl resin (Triton B-1956). | 0.1 | Do. |
| Sodium alkyd aryl polyether sulfonate (Triton X-200). | 0.1 | Negative. |

The protective activity reported in this table was appraised in relation to cycloheximide alone which at twenty-part parts per million caused chlorosis, distortion, stunting, and necrosis. "Very good" means that little if any of these effects were observed. "Good," "fair," and "slight" grade down to "no effect," the point where no improvement was noted, and on to "negative" where an increase in phytotoxicity was noted.

It has been further found that in accordance with the invention the protective effect of solubilized lignins can be further enhanced by including in the cycloheximide spray formulation, or otherwise concomitantly applying to the plant foliage to be treated, a protective surfactant. These surfactants that are useful for this purpose are those which, in the absence of solubilized lignins, exert a like effect in reducing the toxicity of cycloheximide and/or protecting the plants from the phytotoxicity of cycloheximide. These include hydrocarbon sulfonate surfactants, carboxyhydrocarbon sulfonate surfactants, and alkyl phosphate surfactants. Surfactants of these classes are well known in the art and are commonly used in the form of their soluble salts, especially the alkali metal salts. Suitable such surfactants include oleic acid sulfonate salt (Sul-fon-ate OA5), alkylbenzenesulfonate salt (Ultrawet K, Santomerse No. 80, Ultrawet DS, Nacconal NRSF), petroleum sulfonate salt (Petronate L), isopropylnaphthalenesulfonate salt (Aerosol OS), xylene sulfonate salt (Noxonate G), condensed naphthalene-formaldehyde sulfonate salt (Tamol N), polymerized alkyl aryl sulfonate salt (Darvan No. 2), alkyl phosphate salt (Victawet 12) and alkyl polyphosphate salt (Na$_5$ capryl$_5$ (P$_3$O$_{10}$)$_2$: Victawet 58B).

In the practical application of the invention, various procedures and formulations can be adopted for the concomitant application to the foliage of cycloheximide and the solubilized lignins. While theoretically each material can be sprayed on the foliage from separate sprays, it is advantageous from a practical standpoint to apply them from a single tank mix. For this purpose the cycloheximide is incorporated in a dispersible vehicle or carrier such as a water-miscible solvent or a wettable powder. The solubilized lignin inherently is water-dispersible and needs no special treatment. If desired, however, other materials and adjuvants can be mixed therewith to facilitate its introduction into the tank mix. If desired the solubilized lignin can be incorporated in the same water-dispersible vehicle that contains the cycloheximide, though such mixtures are not always best because such mixtures sometimes do not have optimum shelf-life. The spray formulations can also include wetting, spreading, dispersing, and sticking agents in accordance with the customary practice in the art.

A particularly advantageous formulation is made up of two parts, one part containing the cycloheximide in a water-dispersible powder, and the other part containing the solubilized lignin together with such wetting, spreading, dispersing, and sticking agents as may be desired, including a protective surfactant if desired. A suitable formulation is as follows (parts and percentages are by weight unless otherwise specified):

| Part A: | Percent |
|---|---|
| Cycloheximide powder | 0.5 |
| Pyrophyllite | 99.5 |

The two powders are milled and blended to give a final product having an average particle size less than about two hundred microns.

| Part B: | Percent |
|---|---|
| Calcium lignosulfonate (Toranil B) | 88.0 |
| Modified phthalic glycerol alkyd resin (Triton B–1956) | 10.0 |
| Sodium lauryl sulfate | 2.0 |

The calcium lignosulfonate and sodium lauryl sulfate are mixed and milled with a fine screen (80 mesh). The mixture is then blended with the Triton B–1956 in a mixer. Triton B–1956, which is primarily a spreader and sticker, is supplied as a liquid containing 77 percent of the surfactant. Its admixture with powdered calcium lignosulfonate and sodium lauryl sulfate provides an easily handled, non-dusting, non-caking, readily water-dispersible, particulate solid product.

The two parts of the above formulation are advantageously packaged in separate containers in a unitary package. Suitably ten ounces of part B can be packaged in a one quart container provided with a compartment or an envelope for containing the complementary amount of part A, the complementary amount being in this case 0.67 ounce of part A for each 10 ounces of part B. When the contents of this package are dispersed in 25 gallons of water, there is obtained a spray mix formulation containing one part per million (0.1 micropercent) of cycloheximide, 0.25 percent of calcium lignosulfonate, 0.03 percent of Triton B–1956, and 0.005 percent of sodium lauryl sulfate.

Instead of using an inactive wetting agent (sodium lauryl sulfate) in part B, a protective surfactant of the class set forth above can be used in order to obtain the combined wetting and protective action characteristic of this class of surfactants. A suitable formulation consists of:

| | Percent |
|---|---|
| Calcium lignosulfonate | 88.0 |
| Alkylbenzenesulfonate (Ultrawet DS) | 2.0 |
| Triton B–1956 | 10.0 |

The alkylbenzenesulfonate and the calcium lignosulfonate are mixed, milled, and screened and the Triton B–1956 blended in as above.

It will be understood that the proportions given in the foregoing examples are illustrative only and that variation can be made therein without departing from the spirit and scope of the invention. In general, the amount of solubilized lignin in the spray formulation can range from about 0.1 percent up to its solubility in the aqueous vehicle. Ordinarily from 0.2 to two percent will be most satisfactory. The amount of protective surfactant is desirably kept low, say from 0.001 to 0.1 percent and the amount of other surfactant from 0.01 to 0.5 percent. Desirably the total surfactant excluding the solubilized lignin, should be not greater than about 0.5 percent. The amount of cycloheximide can range up to 2.5 micropercent depending upon mode of application and plant treated. The desirable amount is between about 0.025 to 1.5 micropercent. A micropercent as used herein is one thousandth of a percent. The proportion suitably can range from one thousand to four thousand parts of solubilized lignin, and fifty to 500 parts of total surfactant for each part of cycloheximide. Advantageously, not more than 200 parts of protective surfactant for each part of cycloheximide is used.

The pyrophyllite can be replaced by any other inert solid powder such as bentonite, talc, kieselguhr, Georgia clay, Attapulgus clay, walnut shell flour, and the like. Such carrier is used in proportion to the cycloheximide as required to give an easily measured and easily water-dispersible powder, as will be readily understood by those skilled in the art. Advantageously the proportion can range from about 0.1 to about five parts of cycloheximide for each one hundred parts of carrier.

Part A if desired can be formulated as a liquid by dissolving the cycloheximide in a suitable quantity of water-miscible solvent. Suitable such solvents are dimethylformamide dimethylsulfoxide, methanol, ethanol, and the like. Any water-miscible polar solvent for cycloheximide can be used.

If desired all the components can be formulated into a single mixture. In general, such single mixtures have the following approximate composition:

| | Parts |
|---|---|
| Cycloheximide | 1 |
| Solubilized lignin | 1000–4000 |
| Protective surfactant | up to 200 |
| Other surfactant | up to 500 |
| Total surfactant | up to 500 |
| Solid inert powder | up to 250 |

The components can be milled and blended together in any order in the preparation of such formulations.

A suitable example is as follows:

| | Parts |
|---|---|
| Cycloheximide | 1 |
| Calcium lignosulfonate | 2600 |
| Alkylbenzenesulfonate (Santomerse No. 80) | 60 |
| Triton B–1956 | 300 |

The cycloheximide, calcium lignosulfonate, and alkylbenzensulfonate are milled and blended, and sieved; the Triton B–1956 is added and blended in as in part B of the two part formulation above.

In place of calcium lignosulfonate in the above formulations, there can be substituted a like amount of the sodium or ammonium or other alkali metal lignosulfonate. The calcium lignosulfonate can also be replaced by a like amount of sodium or ammonium or other alkali metal lignate. The alkylbenzenesulfonate can be replaced by any of the protective surfactants listed above. The Triton B–1956 can be replaced by any of the commercially available spreaders and/or stickers, and the sodium lauryl sulfate can be replaced by other wetting agents commonly used in insecticidal and fungicidal compositions.

The formulations and tank mixes according to the invention can include compatible insecticides, fungicides, and bactericides, or combinations of the same, e. g., N-(trichloromethylthio) - 1,2,3,6 - tetrahydrophthalimide (Captan), ferric dimethyldithiocarbamate (Ferbam), sulfur, 1,1,1 - trichloro - 2,2 - bis(p-chlorophenyl)ethane (DDT), 1,1,1-trichloro-2,2-bis(p-methoxyphenyl)ethane (Methoxychlor), aldrin, dieldrin, lindane, 2'-chloroethyl-1-methyl-2-(p-tert-butylphenoxy) ethyl sulfite (Aramite), rotenone, tetramethyl thiuram disulfide, pentachloronitrobenzene, 2,3-dichloro-1,4-naphthoquinone (Phygon), etc.

If desired, there may be included in the formulations and/or tank mixes of the invention, a buffer salt such as citrate buffer or phosphate buffer to keep the pH below that, about pH 8, at which cycloheximide tends to lose activity. Potassium bisulfate has been found to be well adapted for use in these formulations described above. Otherwise, alkaline ingredients such as strongly alkaline carriers, fungicides, and insecticides that would raise the pH value to about 8 or more should be avoided.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

We claim:

1. The method of protecting foliage plants from injury on the application of cycloheximide thereto which comprises concomitantly applying to said foliage a solubilized lignin in the proportions of from about 1,000 to about 4,000 parts of solubilized lignin for each part of cycloheximide.

2. The method of claim 1 in which the solubilized lignin is calcium lignosulfonate.

3. The method of claim 1 in which the solubilized lignin is sodium lignosulfonate.

4. The method of claim 1 in which the solubilized lignin is ammonium lignosulfonate.

5. The method of claim 1 in which the solubilized lignin is sodium lignate.

6. The method of claim 1 in which the solubilized lignin is ammonium lignate.

7. The method of protecting foliage plants from injury on the application of cycloheximide thereto which comprises concomitantly applying to said foliage a solubilized lignin and a protective surfactant selected from the group consisting of hydrocarbon sulfonate surfactants, carboxyhydrocarbon sulfonate surfactants, and alkyl phosphate surfactants in the proportions of about 1,000 to about 4,000 parts of solubilized lignin, and about 50 to 500 parts of surfactant for each part of cycloheximide.

8. The method of claim 7 in which the solubilized lignin is calcium lignosulfonate.

9. The method of claim 8 in which the protective surfactant is a sodium alkylbenzenesulfonate.

10. A composition of matter comprising cycloheximide and solubilized lignin in the proportion of from about one thousand to about four thousand parts of solubilized lignin for each part of cycloheximide.

11. The composition of matter of claim 10 in which the solubilized lignin is calcium lignosulfonate.

12. The composition of matter of claim 10 in which the solubilized lignin is sodium lignosulfonate.

13. The composition of matter of claim 10 in which the solubilized lignin is ammonium lignosulfonate.

14. The composition of matter of claim 10 in which the solubilized lignin is sodium lignate.

15. The composition of matter of claim 10 in which the solubilized lignin is ammonium lignate.

16. A composition of matter comprising cycloheximide, solubilized lignin, and a surfactant in the proportions of about one thousand to about four thousand parts of solubilized lignin, and about fifty to 500 parts of surfactant for each part of cycloheximide.

17. The composition of claim 16 in which the solubilized lignin is calcium lignosulfonate.

18. The composition of claim 16 in which the surfactant comprises a protective surfactant selected from the group consisting of hydrocarbon sulfonate surfactants, carboxyhydrocarbon sulfonate surfactants, and alkyl phosphate surfactants in an amount not greater than 200 parts for each part of cycloheximide.

19. The composition of claim 18 in which the solubilized lignin is calcium lignosulfonate.

References Cited in the file of this patent

UNITED STATES PATENTS

| | | |
|---|---|---|
| Re. 24,184 | Sanders et al. | July 24, 1956 |
| 1,002,247 | Ellis | Sept. 5, 1911 |
| 1,460,012 | Berend | June 26, 1923 |
| 1,973,910 | Peterson | Sept. 18, 1934 |

OTHER REFERENCES

"Handbook of Aldrin, Dieldrin and Endrin Formulations," Shell Chem. Co., N. Y., 1954, pp. 16 and 27.

Felber et al.: "Control of Mildew on Bean Plants by Means of an Antibiotic," Botan. Gazette, vol. 110, 1945, pp. 324–325.

Agri. Chem., Apr. 1950, pp. 64 and 97.

Brian: "The Use of Antibiotics for Control of Plant Diseases Caused by Bacteria and Fungi," J. of Applied Bact., vol. 17, 1954, pp. 142, 145 and 146.